(12) United States Patent
Pei et al.

(10) Patent No.: US 10,445,840 B2
(45) Date of Patent: Oct. 15, 2019

(54) SYSTEM AND METHOD FOR POSITIONING SPONSORED CONTENT IN A SOCIAL NETWORK INTERFACE

(71) Applicant: Microsoft Technology Licensing, LLC, Redmond, WA (US)

(72) Inventors: Lihong Pei, Mountain View, MN (US); Kai Wei, Belmont, CA (US); Nihar N. Mehta, Sunnyvale, CA (US); Ashvin Kannan, Sunnyvale, CA (US); Deepak Agarwal, Sunnyvale, CA (US); Guangyu Dong, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 414 days.

(21) Appl. No.: 14/170,322

(22) Filed: Jan. 31, 2014

(65) Prior Publication Data

US 2015/0046278 A1    Feb. 12, 2015

Related U.S. Application Data

(60) Provisional application No. 61/863,219, filed on Aug. 7, 2013.

(51) Int. Cl.
*G06Q 30/00*    (2012.01)
*G06Q 50/00*    (2012.01)
(Continued)

(52) U.S. Cl.
CPC ............. *G06Q 50/01* (2013.01); *G06Q 30/02* (2013.01); *G06Q 30/0269* (2013.01);
(Continued)

(58) Field of Classification Search
CPC . G06Q 30/0277; G06Q 30/0269; G06Q 30/02
See application file for complete search history.

(56) References Cited

U.S. PATENT DOCUMENTS 8,600,802 B1 * 12/2013 Tveit ................. G06Q 30/0244
                                                      705/14.1
8,825,698 B1 *  9/2014 Gong .................... G06F 16/951
                                                      707/769

(Continued)

OTHER PUBLICATIONS

Martin, Shirley; A Case Study in Cluster Analysis for Intranet Organization, 2001 IEEE; p. 57-64; 2001.*

(Continued)

*Primary Examiner* — Radu Andrei
(74) *Attorney, Agent, or Firm* — Schwegman Lundberg & Woessner, P.A.

(57) ABSTRACT

A system and method optionally includes or utilizes a processor may receive a request for social network content for display in a position of a plurality of sponsored content positions in a newsfeed of a social network interface, each of the plurality of sponsored content positions having a position criterion, at least two of the plurality of sponsored content positions having a different position criterion and identify a sponsored content item of a plurality of sponsored content items stored on a database based, at least in part, on a characteristic of the sponsored content item meeting the position criterion and a bid associated with the sponsored content item. A transmitter may transmit the sponsored content item from the processor to a server for display on a user interface.

15 Claims, 7 Drawing Sheets

(51) Int. Cl.
*G06Q 30/02* (2012.01)
*H04L 29/08* (2006.01)
*H04L 29/06* (2006.01)

(52) U.S. Cl.
CPC ......... *G06Q 30/0277* (2013.01); *H04L 67/36* (2013.01); *H04L 67/42* (2013.01)

(56) References Cited

U.S. PATENT DOCUMENTS

| | | | | |
|---|---|---|---|---|
| 9,286,622 | B2* | 3/2016 | Choi | G06Q 30/00 |
| 9,880,994 | B1* | 1/2018 | Choi | G06F 17/248 |
| 2004/0024640 | A1* | 2/2004 | Engle | G06Q 30/02 |
| | | | | 705/14.69 |
| 2008/0114672 | A1* | 5/2008 | Yahia | G06Q 30/02 |
| | | | | 705/37 |
| 2009/0055759 | A1* | 2/2009 | Svendsen | G11B 27/00 |
| | | | | 715/764 |
| 2009/0299993 | A1* | 12/2009 | Novack | G06Q 10/06 |
| 2010/0037253 | A1* | 2/2010 | Sheehan | H04H 20/103 |
| | | | | 725/31 |
| 2010/0198767 | A1* | 8/2010 | Farrelly | H04L 67/306 |
| | | | | 706/46 |
| 2010/0293050 | A1* | 11/2010 | Maher | G06Q 30/02 |
| | | | | 705/14.46 |
| 2010/0299687 | A1* | 11/2010 | Bertino-Clarke | |
| | | | | G06Q 30/0241 |
| | | | | 725/5 |
| 2011/0173570 | A1* | 7/2011 | Moromisato | G06F 16/904 |
| | | | | 715/838 |
| 2011/0302601 | A1* | 12/2011 | Mayo | H04N 21/23412 |
| | | | | 725/32 |
| 2012/0158494 | A1* | 6/2012 | Reis | G06Q 30/0241 |
| | | | | 705/14.49 |
| 2012/0221476 | A1* | 8/2012 | Candelario | G06Q 10/063112 |
| | | | | 705/321 |
| 2013/0036065 | A1* | 2/2013 | Chen | G06Q 10/063112 |
| | | | | 705/319 |
| 2013/0144899 | A1* | 6/2013 | Lee | G06Q 50/01 |
| | | | | 707/759 |
| 2013/0246165 | A1* | 9/2013 | Choi | G06Q 30/00 |
| | | | | 705/14.45 |
| 2013/0262175 | A1* | 10/2013 | Deshpande | G06Q 10/06 |
| | | | | 705/7.25 |
| 2014/0019261 | A1* | 1/2014 | Hegeman | G06Q 30/02 |
| | | | | 705/14.71 |
| 2014/0188766 | A1* | 7/2014 | Waldman | G06Q 30/0283 |
| | | | | 705/400 |
| 2014/0280294 | A1* | 9/2014 | Stekkelpak | G06F 16/9535 |
| | | | | 707/769 |
| 2014/0280550 | A1* | 9/2014 | Glass | H04L 67/22 |
| | | | | 709/204 |
| 2014/0306978 | A1* | 10/2014 | Du | G06T 1/00 |
| | | | | 345/581 |
| 2014/0329594 | A1* | 11/2014 | Kim | A63F 13/40 |
| | | | | 463/31 |
| 2014/0330809 | A1* | 11/2014 | Raina | G06F 17/2705 |
| | | | | 707/722 |
| 2014/0376403 | A1* | 12/2014 | Shao | H04W 8/18 |
| | | | | 370/254 |
| 2015/0007230 | A1* | 1/2015 | Bulava | H04N 21/4312 |
| | | | | 725/41 |
| 2015/0046515 | A1 | 2/2015 | Pei et al. | |
| 2015/0095154 | A1* | 4/2015 | Kannan | G06F 16/13 |
| | | | | 705/14.55 |
| 2015/0154228 | A1* | 6/2015 | Vanco | G06F 16/54 |
| | | | | 707/724 |
| 2017/0300597 | A1* | 10/2017 | Moromisato | G06F 16/904 |
| 2019/0038184 | A1* | 2/2019 | Narasimhan | G06F 1/1694 |
| 2019/0102806 | A1* | 4/2019 | Doshi | G06Q 30/0275 |
| 2019/0130444 | A1* | 5/2019 | Fei | G06N 20/00 |
| 2019/0139096 | A1* | 5/2019 | Chen | G06Q 30/0275 |
| 2019/0205918 | A1* | 7/2019 | Kim | G06Q 30/0243 |

OTHER PUBLICATIONS

Martins, Bruno; Extracting and Exploring the Geo-Temporal Semantics of Textual Resources; IEEE Internationl Conference on Semantic Computing 2008; p. 1-9; 2008.*
"U.S. Appl. No. 14/170,352, Final Office Action dated Feb. 8, 2017", 24 pgs.
"U.S. Appl. No. 14/170,352, Non Final Office Action dated May 4, 2017", 27 pgs.
"U.S. Appl. No. 14/170,352, Response filed Apr. 10, 2017 to Final Office Action/ dated Feb. 8, 2017", 19 pgs.
"U.S. Appl. No. 14/170,352, Non Final Office Action dated Sep. 14, 2017", 28 pgs.
"U.S. Appl. No. 14/170,352, Examiner Interview Summary dated Aug. 16, 2017", 3 pgs.
"U.S. Appl. No. 14/170,352, Response filed Aug. 22, 2017 to Non Final Office Action dated May 4, 2017", 8 pgs.
"Non Final Office Action Issued in U.S. Appl. No. 14/170,352", dated Oct. 22, 2018, 19 Pages.
"U.S. Appl. No. 14/170,352, Examiner Interview Summary dated Jul. 31, 2018", 3 pgs.
"U.S. Appl. No. 14/170,352, Final Office Action dated May 2, 2018", 19 pgs.
"U.S. Appl. No. 14/170,352, Response filed Feb. 28, 2018 to Non Final Office Action dated Sep. 14, 2017", 19 pgs.
"U.S. Appl. No. 14/170,352, Response filed Aug. 1, 2018 to Final Office Action dated May 2, 2018", 19 pgs.
"Final Office Action Issued in U.S. Appl. No. 14/170,352", dated Apr. 18, 2019, 23 Pages.
"Examiner Interview Summary Issued in U.S. Appl. No. 14/170,352", dated Jul. 3, 2019.

* cited by examiner

SYSTEM AND METHOD FOR POSITIONING SPONSORED CONTENT IN A SOCIAL NETWORK INTERFACE

PRIORITY

This application claims the benefit of priority to U.S. Provisional Application No. 61/863,219, filed Aug. 7, 2013, which is incorporated by reference herein in its entirety.

TECHNICAL FIELD

The subject matter disclosed herein generally relates to a system for positioning sponsored social network content in a user interface.

BACKGROUND

Contemporary social networks display content from a variety of sources. Member profiles, user messages and comments, information from groups and companies, advertisements, and the like can combine to create the overall content that constitutes at least some of the content that can be displayed on a web page to users of the social network. Some of the content can be generated organically by the users of the social network and the activities of the members of the social network. So-called organic content may not, in some examples, include content such as imported content or system-generated content. Some of the content, such as targeted messages, slideware, whitepapers, and advertisements, can be sponsored by the creators or providers and can be displayed to users based, for instance, on the creator or provider paying a fee to the provider of the social network to have that content displayed on the social network.

BRIEF DESCRIPTION OF THE DRAWINGS

Some embodiments are illustrated by way of example and not limitation in the figures of the accompanying drawings.

DETAILED DESCRIPTION

Example methods and systems are directed to positioning sponsored social network content in a user interface. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A user interface for a social network may conventionally include a sequential list social network content that is prominently displayed and organized to allow users of the social network to scan through social network content. Sometimes referred to as a "newsfeed", the list may be ordered based on a variety of factors, including the time the content was generated and relevance to the user of the social network to whom the newsfeed is displayed. Given that a social network may be focused around organic content, the manner in which sponsored content is displayed within the newsfeed may be of significance; a social network newsfeed may advantageously maintain a large amount of organic content in the newsfeed while interspersing sponsored content in places and in amounts that may be visible but not overwhelming to a generally organic characteristic of the newsfeed.

A social network system has been created that can provide sponsored content within a newsfeed that is based on characteristics of the sponsored content and criteria of various defined positions within the newsfeed. Various positions within the newsfeed list may be designated for one of organic and sponsored content. A platform that provides content for the newsfeed may request sponsored content that meets the position criteria, whereupon a sponsored content platform may identify and transmit a sponsored content item that meets the position criteria. In various examples, if sponsored content that meets the position criteria is not available then the position may be filled with organic content or left unfilled. In various examples, position criteria may correspond to different positions depending on factors such as the type of user device the newsfeed is to be displayed on.

Figure 1:
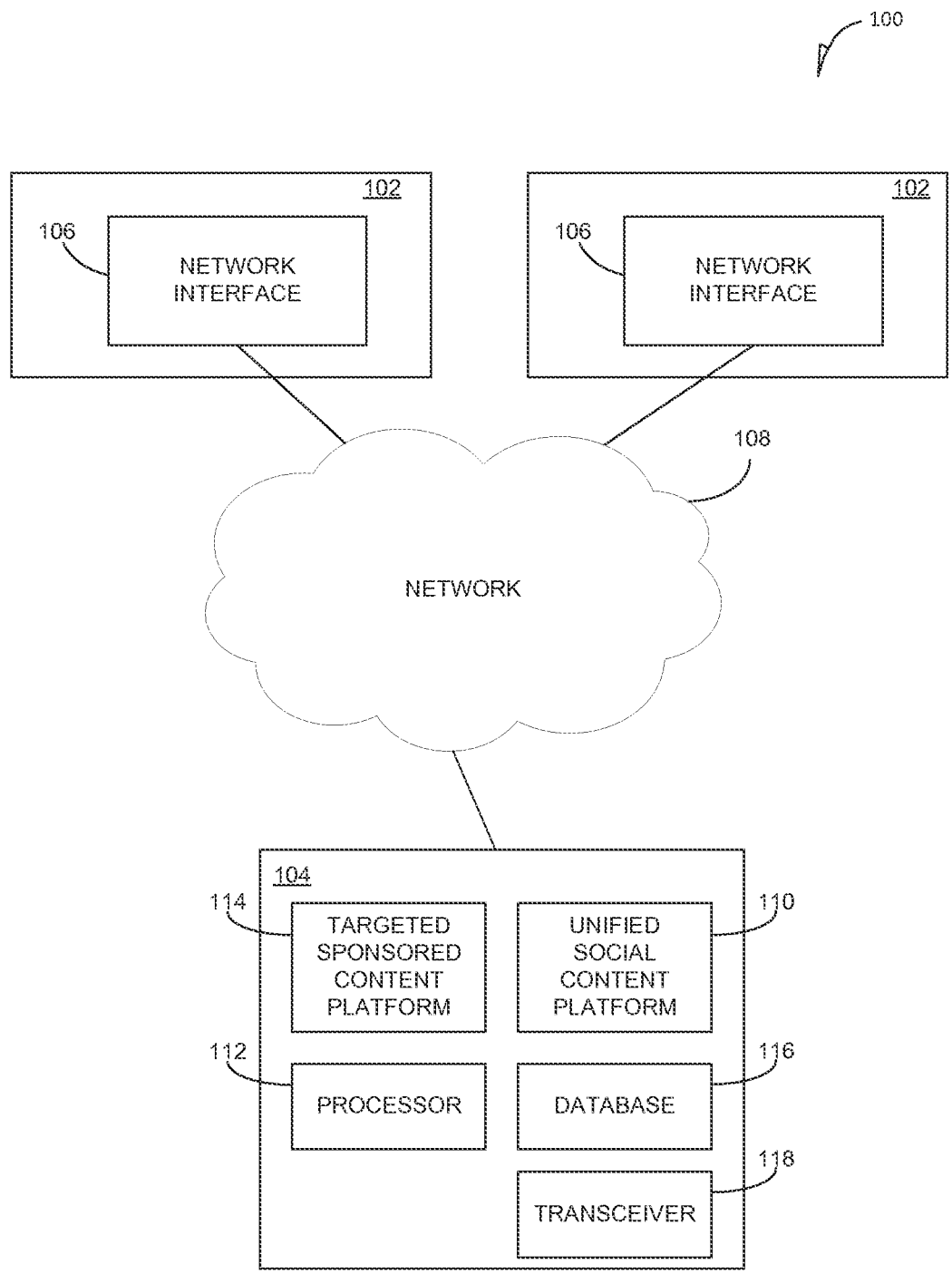
FIG. 1 is a block diagram of a system including user devices and a social network server, in an example embodiment.

FIG. 1 is a block diagram of a social network system 100 including user devices 102 and a social network server 104. User devices 102 can be a personal computer, netbook, or electronic notebook, corresponding to the user devices 102A that may display the social network on a convention web browser, or to a smartphone, personal digital assistant (PDA), tablet computer, or any electronic device 102B known in the art that may utilize a specialized application (or "app") configured to display the social network. The user devices 102 can include a network interface 106 that is communicatively coupled to a network 108, such as the Internet.

The social network server 104 can be communicatively coupled to the network 108. The server 104 can be an individual server or a cluster of servers. The server 104 can be configured to perform activities related to serving the social network, such as storing social network information, processing social network information according to scripts and software applications, transmitting information to present social network information to users of the social network, and receive information from users of the social network. The server 104 can include one or more electronic data storage devices, such as a hard drive, and can include a processor. The social network server 104 can store information related to members of the social network. For instance, for an individual person, the member's information can include name, age, gender, profession, location, activities, likes and dislikes, and so forth. For an organization, such as a company, the information can include name, offered products for sale, available job postings, organizational interests, forthcoming activities, and the like.

The server 104 includes a unified social content platform 110, a processor 112, a targeted social content platform 114, a database 116, and a transmitter 118 configured to transmit data to user devices 102 via the network 106. The unified social content platform 110 can store and access social network information on the electronic storage devices, can reside on the electronic storage devices, and can utilize or be provided by the processor. The targeted sponsored content platform 114 can provision content according to a sponsored content campaign. The database 116 can store information related to the social network, such as to the provision of the sponsored content campaign.

While the servers 104 are illustrated as incorporating particular elements 110, 112, 114, 116, it is to be recognized and understood that the system 100 may incorporate one or more servers 104 having a variety of elements 110, 112, 114, 116. In various examples, the unified social content platform 110 is provided on multiple servers 104 or each server 104, or may be provided on a server 104 that does not incorporate, for instance, the targeted sponsored content platform 114 or the database 116. Similarly, the database 116 may be located in multiple servers 104 or may be located in server 104 separate to that of an instance of the targeted sponsored content platform.

Figure 2A:
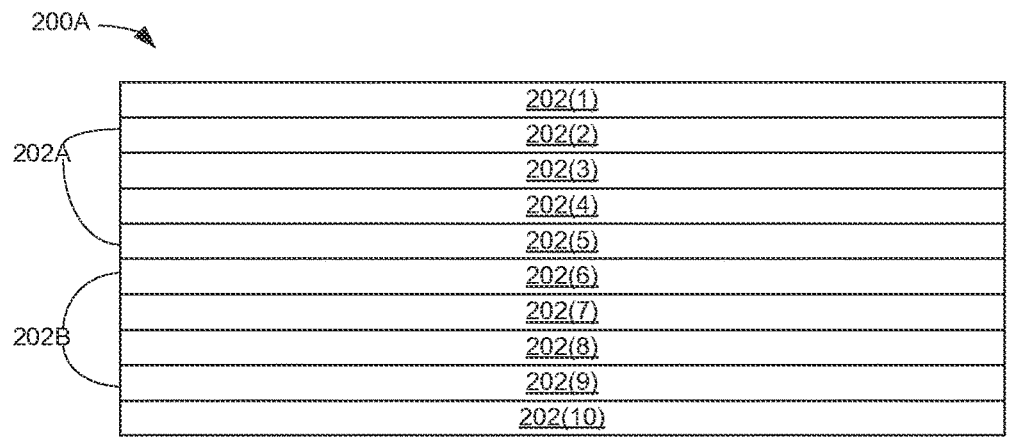
FIGS. 2A and 2B are abstract depictions of newsfeeds that may be a portion of a larger graphical user interface configured to be displayed on a variety of user devices of different types, in an example embodiment.
Figure 2B:
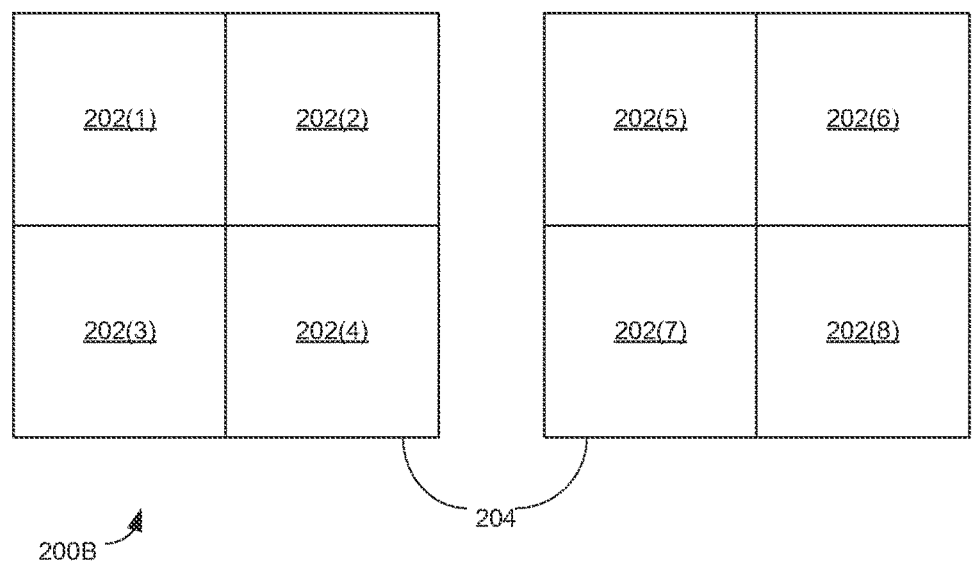

FIGS. 2A and 2B are abstract depictions of newsfeeds 200A, 200B, respectively (collectively "newsfeed 200" herein), that may be a portion of a larger graphical user interface configured to be displayed on a variety of user devices 102 of different types, as disclosed herein. The abstract newsfeeds 200 each incorporate multiple positions 202 in which various social network content items, such as the activity (300; see FIG. 3), as generated according to systems and processes disclosed in detail herein may be displayed. The positions 202 and associated content are abstracted here for illustrative purposes but may be displayed according to the detailed implementations disclosed herein.

In an example, the positions 202 are fixed as predetermined sponsored content positions 202A and organic content positions 202B. From instance to instance of the display of the newsfeed 200, positions 202 may be variously be either sponsored content positions 202A or organic content positions 202B, though upon the determination of the position being a sponsored content position 202A or an organic content position 202B the position may that status while the newsfeed 200 is being provided to the user device 102. For instance, the position 202(4) may be a sponsored content position 202A in a first provision of the newsfeed 200 to a user device and an organic content position 202B in a second, subsequent provision of the newsfeed 200 to the user. It is emphasized that certain positions 202 may not change their content type. A position 202 may be assigned a content type randomly, pseudo-randomly, according to a predetermined algorithm, or according to a user selection.

If suitable sponsored content is not available for a sponsored content position 202A, organic content may be placed in the sponsored content position 202A. Relatedly, if suitable organic content is not available for an organic content position 202B, sponsored content may be placed in the organic content position 202B. In an example, a request to fill a newsfeed 200 may receive approximately two hundred and fifty (250) pieces of content between the unified social content platform 110 and the targeted sponsored content platform 114.

Alternatively, the positions 202 are not fixed as predetermined sponsored 202A or organic positions 202B but rather are adaptable to various circumstances. In an example, each position 202 includes characteristics that are assessed for both sponsored content and organic content and the best or most qualified content for the position 202 is placed in the position without respect to the content being sponsored or organic. The positions 202 may have a maximum number of sponsored content positions. For instance, starting from the first position 202(1), the positions 202 may be filled by the best-suited content but, upon the maximum number of sponsored content positions 202 having been filled, the remainder of the positions 202 may be filled with organic content.

The newsfeed 200A may correspond to the display of the newsfeed 200 generally on a web browser on a user device 102A. The newsfeed 200A may be presented as a conventional, linearly-sequential list. The list may be scrolled up and down to show the various positions 202 in the newsfeed 200.

The newsfeed 200B may correspond to the display of the newsfeed 200 generally on an application, such as may be dedicated for the display of the social network generally and the newsfeed 200B specifically. The newsfeed 200B may be scrolled between pages 204 that each show a portion of the newsfeed 200B, such as by swiping between and among pages. In various examples, each page 204 is displayed on a user interface one at a time and individually.

The positions 202 within the newsfeeds 200A, 200B may correspond to one another, resulting in an assignment to one position, e.g., the third position 202(3), being operable in both newsfeeds 200A, 200B. The targeted sponsored content platform 114 may conduct tests between newsfeeds 200A, 200B, for instance determining whether the third position 202(3) produces different user interactions with content in one newsfeed 200 but not the other. In various examples, the unified social content platform 110 and the targeted sponsored content platform 114 may provide content to different positions 202 depending on the nature of the newsfeed 200A, 200B.

The targeted sponsored content platform 114 may assign sponsored content to sponsored content positions 202A. The targeted sponsored content platform 114 may also assign a cost to a sponsoring entity for placing the sponsoring entity's content in the sponsored content positions 202A. The targeted sponsored content platform 114 may utilize information from the targeted sponsored content platform 114 generally and the system 100 as a whole to determine the position 202A sponsored content should be assigned to and the associated cost. Such information may include a predicted likelihood that a piece of sponsored content will be selected (e.g., by clicking a link) or engaged with (e.g., by "liking" or commenting on the sponsored content) by a user, also known as a click-through rate or likelihood; a bid by the sponsoring entity; a budget of the sponsoring entity; and so forth.

Factors may be modified or additional factors may be utilized in selecting positions 202A for sponsored content. In an example, factors such as predicted click through rate may be given an increased weight or content that has high engagement may be weighted more highly, such as to seek to promote content that may be more likely to be widely disseminated both within the social network and outside of the social network. Factors may be manually adjusted or may be adjusted according to criteria for identifying content that is likely to be widely disseminated, such as from already relatively high click through rates, the prevalence of the content on other social networks or websites, and the like.

In various examples, relevance of sponsored content to a user of the user device 102 on which the sponsored content is to be displayed may not be considered. Sponsored content may be presented to users regardless of the relationship of characteristics of the sponsored content to characteristics of the user. Alternatively, all or certain classifications of sponsored content may be presented to users based on a relevance of the sponsored content to the user. See, e.g., U.S. patent application Ser. No. 13/679,765, "USER CHARACTERISTICS-BASED SPONSORED JOB POSTINGS," which is incorporated by reference herein in its entirety.

The targeted sponsored content platform 114 may establish threshold criteria for posting sponsored content to a newsfeed 200. In an example, a piece of sponsored content may have to meet a likelihood of an engagement with the sponsored content or with a following event to the sponsored content, e.g., subsequent interaction with a webpage that a sponsored link takes a user to. The likelihood of engagement may be with respect to all users of the social network, a subset of users of the social network, or to individual users to whom the sponsored content may be presented. In a further example, the sponsored content may have an expected revenue threshold for presentation on a newsfeed 200. The expected revenue may be based on revenue that the sponsoring entity may pay the provider of the social network or based on a revenue the users to whom the sponsored content is to be displayed may be expected to generate by engaging with the sponsored content, such as by subsequently purchasing items related to the sponsored content.

The threshold criteria may vary depending on the position 202 in which the sponsored content may be displayed. For instance, the first position 202(1) may have a higher threshold condition than lower positions, e.g., the fifth position 202(5). In an example, then, sponsored content that does not meet the threshold criteria for the first position 202(1) may meet the threshold criteria for the fifth position 202(5). The threshold criteria may be adjustable to test various sponsored content campaigns and/or for various users or classes of users. For instance, certain users may have subscriptions to the social network or may otherwise have a status that may reduce or change the quality of sponsored content shown to them, in which case the thresholds for that class of users may be raised relative to conventional users.

The targeted sponsored content platform 114 may adjust the threshold or thresholds based on a desired outcome for user engagement with sponsored content. It is noted that the adjustments may increase or decrease the exposure of users to the sponsored content, including by increasing or decreasing the number of times the sponsored content is displayed in the newsfeed and by increasing or decreasing the position 202 the sponsored content is likely to occupy.

In an example, the thresholds applied may be a click through rate ("CTR"). The CTR may be applied to various specific conditions, such as a CTR_on_article for a particular article or CTR_on_follow_the_company, for a prompt to a user to follow a particular company. Thresholds may further be applied to an estimated revenue per follow up ("EstRev"). In an example, any position 202 where a sponsored content may be placed may have some EstRev for showing the sponsored content item or getting a click on the sponsored content item. The sponsored content item can be ranked, applied against a threshold, and/or placed strictly by EstRev, in one example. More generally, according to the variables presented above, the sponsored content item can be ranked, applied against a threshold, and/or placed according to alpha1*EstRev+alpha2*CTR_on_article+alpha3*CTR_on_Follow_the_company, where alpha1, alpha2, and alpha3 are estimated and/or tuned parameters or variables, and that these parameters can vary between and among positions 202 to establish various thresholds for various positions 202. It is emphasized that the above equation may be applied with any of a variety of click through rates, revenue estimates, or any other factor that may be useful in establishing thresholds for certain positions 202.

The targeted sponsored content platform 114 may conduct live tests on the social network or may model past social network performance to create estimated test results. For instance, the targeted sponsored content platform 114 may note that links in the fifth position 202(5) have a particular click through rate. On that basis, the targeted sponsored content platform 114 may set thresholds on the initial assumption that sponsored content with a link will generate an anticipated click through rate in the fifth position 202(5) and adjust the thresholds accordingly. The targeted sponsored content platform 114 may then update the thresholds based on actual performance of the sponsored content.

It is noted that, as disclosed herein, the generation of the newsfeeds 200 may incorporate the functionality of both the unified social content platform 110 and the targeted sponsored content platform 114. The targeted sponsored content platform 114 may conduct sponsored content matching with users of the social network by utilizing relevancy to the user and other factors and may manage a sponsored content campaign, such as through monitoring and managing a frequency at which sponsored content is displayed and managing a sponsored content campaign budget. The targeted sponsored content platform 114 may select sponsored content based on factors such as the estimated cost per impression ("ECPI"; EPCI may be equivalent to the EstRev or may be relatively more limited to only the cost of the impression) to the sponsoring entity based, for instance, on a function of the current or estimated click through rate for a piece of sponsored content and the sponsored content campaign cost structure per click, impression, or engagement with the sponsored content. The unified social content platform 110 may provide organic content and render the combined content in a unified format.

The targeted sponsored content platform 114 may generate the estimated cost per impression based, at least in part, on previous performance of the sponsored content and/or other sponsored content. In general, revenue and user engagement may be estimated for some or all of the sponsored content managed by the targeted sponsored content platform 114 and cross-referenced against associated sponsored content campaigns. For instance, past performance of the sponsored content may be utilized to estimate future revenue and user engagement, such as by estimating the click through rate of a piece of sponsored content. The estimates may be position 202 specific. For instance, the performance of sponsored content in the first position 202(1) may be expected to be different than the performance of sponsored content in the fifth position 202(5). The decision to place the sponsored content in the various positions 202 may be guided by the estimated or expected performance of the sponsored content in each position 202. Given the budget and other criteria of the sponsored content campaign, the targeted sponsored content platform 114 may elect to place a particular piece of sponsored content in different positions 202.

The targeted sponsored content platform 114 may rank the various sponsored content according to various factors. In an example, the sponsored content is ranked according to estimated revenue and user engagement. In various examples, estimated revenue is based on related sponsored content campaign details while the user engagement is based on past user engagement with the sponsored content or related sponsored content and past user engagement based on the various positions 202 of the newsfeed 200.

In an illustrative example, a first piece of sponsored content has a cost-per-click bid of twenty (20) cents and an estimated click through rate of five (5) percent, producing a score of one hundred (100), while a second piece of sponsored content has a cost-per-click bid of eighteen (18) cents and an estimated click through rate of six (6) percent, producing a score of 108. In the illustrative example, the first position 202(1), fifth position 202(5), and tenth position 202(10) are eligible for sponsored content, with the first position 202(1) having a threshold of one hundred ten (110), the fifth position 202(5) having a threshold of one hundred (100) and the tenth position having a threshold of eighty (80). Because neither of the scores for the first and second sponsored content meet the threshold for the first position 202(1), the first position 202(1) is not filled with sponsored content; in an example, the unified social content platform 110 may fill the first position 202(1) with organic content. While both the first and second sponsored content meet the threshold for the fifth position 202(5), the second sponsored content is selected and placed in the fifth position 202(5) because the second sponsored content has the higher score. Finally, because the first sponsored content is the last remaining sponsored content and meets the threshold of the tenth position 202(10), the first sponsored content is placed in the tenth position 202(10). It is to be recognized and understood that the above example is illustrative and may be readily expanded or adapted to any number of sponsored content items and sponsored content positions 202A.

It is further noted that while the above ranking involves a combination of applied against a threshold, and/or placed cost-per-click bid and an estimated click through rate, each of those factors or other factors may be considered separately. Thus, the first position 202(1) may have thresholds of at least twenty (20) cents of cost-per-click bid and at least a six (6) percent click through rate while the fifth position 202(5) may have thresholds of at least twenty (20) cents of cost-per-click bid and at least a five (5) percent click through rate. The principles for cost-per-click may be readily applied to other metrics, such as click through rate and others. In such an example, and utilizing the above estimates for the first and second sponsored content items, neither the first nor second sponsored content items would meet the thresholds for the first position 202(1) but the first sponsored content item would meet the thresholds for the fifth position 202(5) while the second sponsored content item would not.

The targeted sponsored content platform 114 may utilize an application programming interface (API) that may distinguish between and adjust ranking factors according to content and position-specific considerations. For instance, the targeted sponsored content platform 114 may distinguish between engagements with sponsored content depending on if the engagement is a selection of the sponsored content itself, a "like" selection or other related social network interaction, a sharing of the sponsored content, a comment on the sponsored content, and so forth.

The targeted sponsored content platform 114 may also adjust expected revenue and estimated engagements for a piece of sponsored content based on the position 202 the sponsored content was in which the sponsored content generated the revenue or generated the engagement. For instance, the first position 202(1) may tend to produce twenty (20) percent more revenue and engagements than the fifth position 202(5). As such, the overall expected revenue for a sponsored content item may be adjusted, such as by normalizing all revenue and engagement with the sponsored content item to the first position 202(1), such as by multiplying revenue generated from the fifth position 202(5) by twenty (20) percent. Data may be further adjusted and/or normalized based on a variety of additional criteria, including the time of day the revenue or engagement occurred.

The threshold for the various positions 202 may be set in relation to what the positions receive with organic content. For instance, the threshold for expected engagement may be set as one (1) percent lower than what the position 202 typically generates with organic content. Thus, if the first position 202(1) typically generates a seven (7) percent click through rate with organic content then the threshold for sponsored content may be set at six (6) percent.

Figure 3:
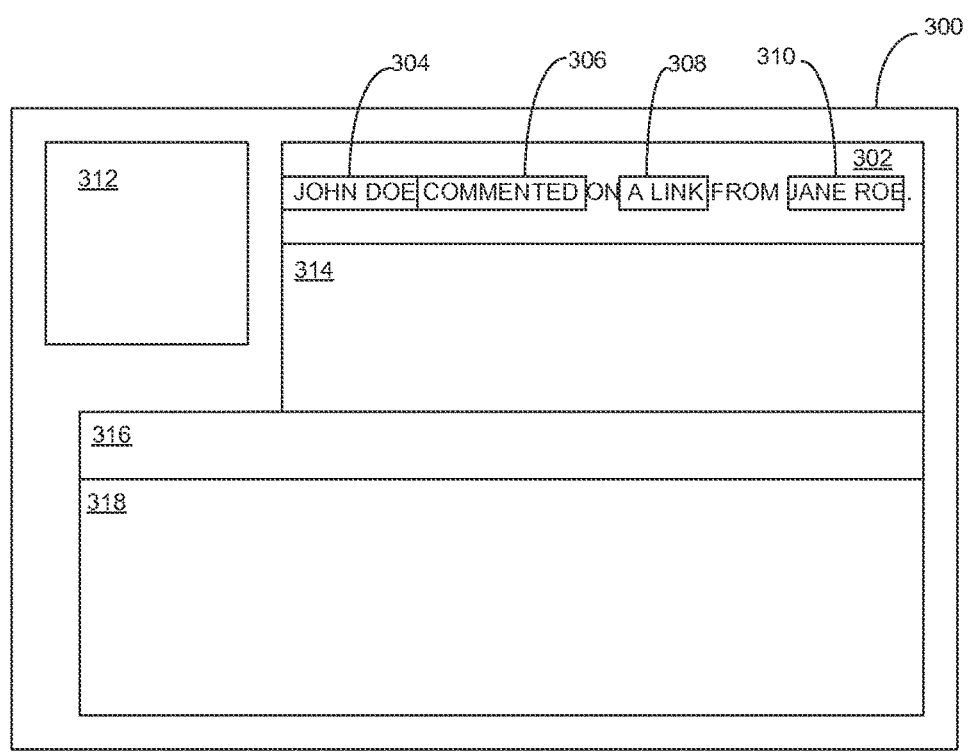
FIG. 3 is a block diagram of a user interface screen displaying an activity provided by a uniform social content platform, in an example embodiment.

FIG. 3 is a block diagram of an activity 300 as displayed on a user interface screen and as provided by the uniform social content platform 110. The activity 300 can be provided on the client devices 102 to the extent that a user account on the social network that corresponds to the activity in question is accessed on the client device 102. In an example, the activity 300 may be according to an actor-verb-object format disclosed herein. In alternative examples, different formatting selections can be generated via the unified social content platform 110.

The screen includes a body 302 of an activity as generated by the summarizer module 214. The illustrative example body 302 includes an actor field 304, a verb field 306, an object field 308, and an attributed entity field 310. The unified social content platform 110 can include text to link together the body fields 304, 306, 308, 310 into a grammatically coherent way. The linking text can be included by a developer, such as via the developer application 212 in the development of the pertinent application, or according to an engine of the unified social content platform 110 that can generate appropriate and substantially grammatically correct phrases.

The actor can be an entity that initiated the activity 300. The actor can be a person or a company, or any entity that can be identified. The verb can be a complex type registered with an application 210. Registration can be based on a user selection via the developer application 212 and can be changed dynamically. Conjugation can be specified by the developer when the verb is registered. A registered verb may also define custom properties by specifying each property's name and type. When a developer publishes an activity, the publisher can specify the verb and provide values for various properties. Development comments can be appended to verbs in various examples.

The object is an entity acted upon by an activity statement. The object can be an entity that has an identifier. The object can be an entity identified by a URL. The object can be an entity that can be summarized with a title and variously a description, an image, and a URL from a publisher of the object. In various examples, an activity can not include an object and can be referred to as a "post".

The object can take the form of a "target". The target can be utilized where the object is part of a larger class. For instance, "X applied for a job at Y" provides Y as an example of a target, where Y is a specific company.

An attributed activity or application can be the originator of the activity. The attributed activity can be provided where the actor of the activity is not the entity that originated the activity. In an exemplary format, "X shared a link from Y" where X and Y are both actors provides an attributed activity.

Standard and custom actions can be available for an activity. Additional actions may be provided by a publisher or developer once the action is registered with the developer application 212. In query results, standard and custom actions can be attached to pertinent activities, and in an example to each pertinent activity, for rendering.

Custom properties may be defined for verbs and objects. Once defined, can activity can be published with the properties. On output, comments and counts of other social actions can be attached to each activity to facilitate rendering the comments and counts can be rendered inline with the activities. Similar activities can be grouped into common families according to a selectable data field of the activity. Annotations can allow semantic regions of text to be marked up upon displaying an activity.

Verbs, objects, and other data types disclosed herein can be customized. Data types can be primitive or complex according to their number of customizable properties. Properties can be utilized to specify data type layout of the activity 300, such as according to syntax and appearance. The develop application 212 can be utilized to customize such properties. The properties can be selectable and customizable according to standard protocols known in the art or according to proprietary protocols.

The activity 300 can include additional information, such as that can be included on social network web sites. An image 312 can provide an image chosen by or indicative of a user of the social network or an entity providing content to the social network. A content rendering section 314 can display information, such as a status update, an article, a web link, and other social network content. A call to action section 316 can provide options for users of the social network to comment on or otherwise interact in a social network context with the content in the rendering section 314. A social summary section 318 can show social network interactions with the content, such as can be conducted by users of the social network in the call to action section 316. For instance, a comment or other use interaction with the content can be displayed in the social summary section 318.

Figure 4:
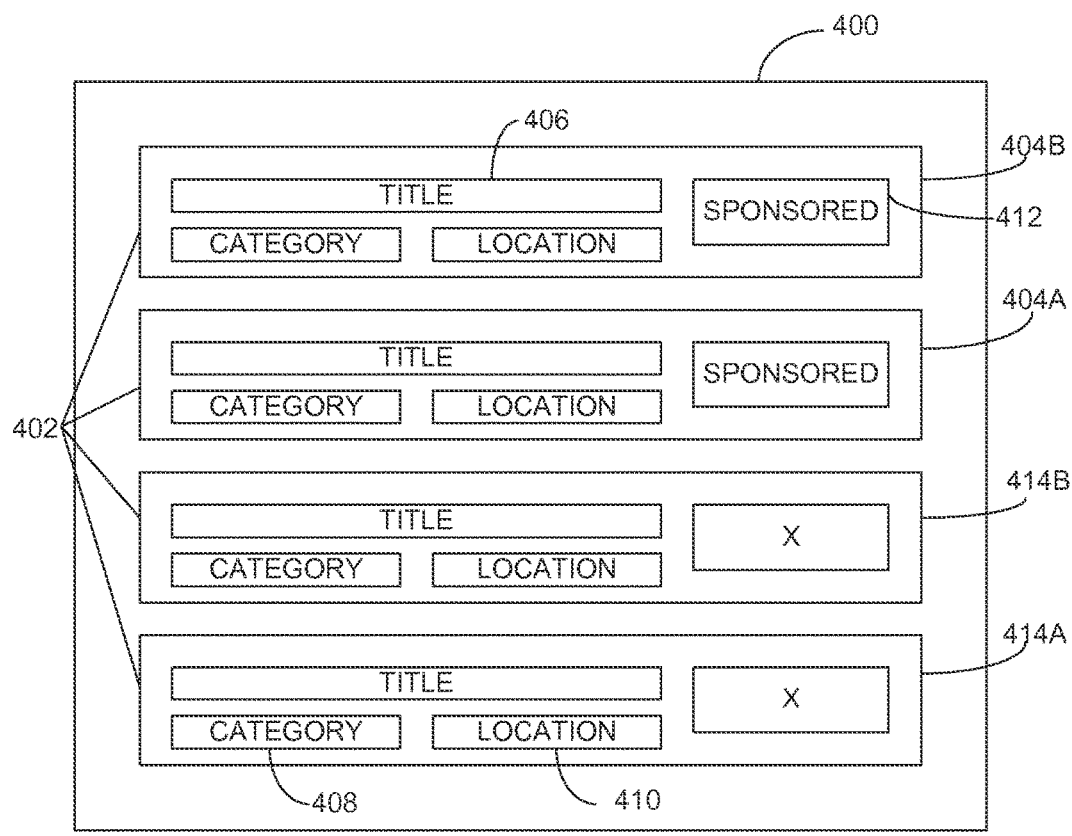
FIG. 4 is a depiction of a user interface screen, in an example embodiment.

FIG. 4 is a depiction of a user interface screen 400 that can be displayed by the social network on the user device 102 corresponding to a user. In an example, the user interface screen 400 is a sub-portion of a larger user interface screen displaying additional information related to the social network. Upon sponsored and organic content having been identified to present to a user, the social network server 104 can transmit the sponsored content to the user device 102, such as along with other social network information that is displayed on a user interface, such as a display screen, of the user device 102.

In the illustrated example, the user interface screen 400 includes a newsfeed 402 of sponsored and organic content. In various examples, the newsfeed 402 is a more detailed version of the abstract newsfeed 200A, or may incorporate elements not present in the newsfeed 200A. In various examples, the newsfeed 402 is an ordered list based on various criteria described herein. If the sponsored recommendation engine 1000 did not identify any sponsored content to present to the user, the user interface screen 400 may only present organic content. Depending on the aggregate sponsored content scores and the criteria for displaying the newsfeed 402, in certain examples only sponsored content is presented on the newsfeed 402.

In an example noted above, sponsored content items 404A, 404B are displayed at the top of the list, i.e., most prominently on the newsfeed 402. In the above example, the sponsored content item 404B corresponds to a sponsored content profile, i.e., characteristics and metadata related to a sponsored content item and/or an associated sponsored content campaign or other source of sponsored content, and is displayed most prominently at the top of the newsfeed 402, while sponsored content item 404A corresponds to a sponsored content profile for which the aggregate sponsored content score is lower than the aggregate sponsored content score corresponding to the first sponsored content item 404B and is displayed below and less prominently on the newsfeed 402 than the first sponsored content item 404B. In the illustrated example, the sponsored content items 404A, 404B include a sponsored content title 406, a sponsored content category 408, a sponsored content location 410, are marked "sponsored" in the label section 412.

In the illustrated example, organic content items 414A, 414B are displayed less prominently than the sponsored content items 404A, 404B. In an illustrative example, the organic content item 414A corresponds to a first relevance score and is displayed above of and more prominently than the organic content item 414B, which has a second relevance score lower than the first relevance score. The organic content items include the content title 406, the content category 408, the content location 410, and the label section 412. In various examples, organic content items 414A, 414B do not incorporate a label section 412 or includes a label section 412 with an indication that the content is not sponsored.

As noted above, various examples permit content items 404A, 404B and 414A, 414B to be displayed in various arrangements depending on the requirements of the social network. Thus, as noted above, the organic content may have their relevance scores converted into aggregate sponsored content scores and then all of the content items 404A, 404B and 414A, 414B positioned in the newsfeed 402 according to their aggregate sponsored content scores. In this way, organic content 414A, 414B may be presented more prominently than some sponsored content items 404A, 404B.

In various examples, the newsfeed 402 may not include any sponsored content item 404A,B, such as if no content has been sponsored or if no sponsored content exceeds the relevance threshold for the user. In various examples, the newsfeed 402 may not include any organic content 414A,B, such as if the social network has been programmed to first present all sponsored content item 404A,B until space on the newsfeed 402 has been exhausted and only then begin displaying organic content.

Acquiring Sponsored and Organic Content

In various embodiments, the system 100 includes logic, such as in the targeted sponsored content platform 114, that can identify user characteristics that conform to a given sponsored content campaign profile. In various examples, upon receiving a request to identify user characteristics similar to a particular sponsored content campaign profile, the system may analyze a variety of user characteristics to select one or more user characteristics that have the highest aggregate sponsored content scores with respect to the sponsored content campaign profile. The identification can be in real-time, understood to be an analysis that is conducted essentially immediately upon receiving the sponsored content profile. After identifying the most similar user characteristics (e.g., those with the highest aggregate sponsored content scores), the system 100 may transmit information related to the sponsored content to the selected users.

Examples of targeting entities include: user characteristics, interest groups, companies, advertisements, events, news, discussions, text posts, short form posts, questions and answers, and so forth. Accordingly, in some examples, by specifying the particular characteristics of two targeting entities to be compared, and by specifying a particular algorithm for use in generating an aggregate score, such as in the instant example an aggregate company score, for the two targeting entities, the targeted sponsored content platform 114 can be configured and customized to perform such tasks as: generate aggregate sponsored content scores for use in presenting sponsored content to a user, generate aggregate sponsored content scores for use in recommending particular interest groups that a user might be interested in joining; generate aggregate sponsored content scores for use in displaying an appropriate or relevant advertisement to a particular user, and many others.

In an example, the targeted sponsored content platform 114 operates in two phases. In the first phase, the data representing each individual instance of a particular targeting entity, such as the user characteristics and the sponsored content characteristic, is processed by a characteristic extraction engine to extract the relevant characteristics on which matching analysis is to be performed. In various examples, in the case of user characteristics, only certain characteristics or portions of a user's characteristics may be selected for use in determining the similarity of any two profiles, such as the user characteristics and a sponsored content profile. As such, during the first phase, a characteristic extraction engine processes each user characteristic to extract the relevant characteristics, including profile characteristics, behavior characteristics, and social graph characteristics. In addition to simply extracting certain characteristics from relevant targeting entities, the characteristic extraction engine may derive certain characteristics based on other information included in the targeting entity, such as from the user characteristics.

In various examples, user characteristics can be obtained inferentially. In one example, one characteristic that may be used to identify similarities between user characteristics and a sponsored content profile is work experience. Work experience may included as a characteristic in user characteristics directly or may be arrived at indirectly, such as by being measured in the number of years since a user graduated from a selected educational institution or achieved a particular educational level. While work experience, in an example, may not be included as raw data in a user's characteristics, it may be derived with a calculation if the user's graduation date is specified in the user's characteristics. In addition, in some examples, the characteristic extraction engine may standardize and/or normalize various characteristics, such as a user's sponsored content or position title, or the name of a company at which a user has indicated being employed. In some examples, certain characteristics may be retrieved from external data sources, using other information included in the targeting entity as part of a query to the external data source.

The first phase may occur in real-time or as a background operation, such as offline or as part of a batch process. In some examples that incorporate relatively large amounts of data to be processed, the first phase may be achieved via a parallel or distributed computing platform. Once the relevant characteristics have been extracted, computed, derived, or retrieved, relevant characteristics of the one or more selected users or sponsored contents can be stored as a pre-processed targeting entity. For instance, in the case of user characteristics, the characteristic extraction process can result in enhanced user characteristics that includes only the relevant characteristics extracted from a user's characteristics as well as any derived or retrieved characteristics. The enhanced characteristics can be used during the targeted sponsored content platform's 114 second phase, when the matching engine compares the relevant characteristics from the sponsored content profile against each user characteristic until those user characteristics with the highest aggregate sponsored content scores are identified.

In an example, during the second phase, the matching engine of the targeted sponsored content platform 114 uses a configuration file that is customized for the particular analysis being performed. For example, a first configuration file (referred to herein as a profile matching configuration file) may exist for use in identifying user characteristics similar to a sponsored content profile, whereas a second configuration file—specifying different characteristics from different targeting entities to be compared, and a different algorithm for computing the matching scores—may be specified for determining the sponsored content that is most likely to be of interest to a particular user. As such, by configuring the characteristic extraction engine to extract relevant data from certain targeting entities, and customizing the analysis performed by the matching engine with an appropriate configuration file, a wide variety of targeting operations can be achieved with the general targeted sponsored content platform 114.

In various examples, the system 100 can obtain a combination of targeted sponsored and organic content for display on a user device 102. As discussed above, the unified social content platform 110 can incorporate or can access or call the targeted sponsored content platform 114. In various examples, the targeted sponsored content platform 114 can receive output from one or more databases (see FIG. 5, 518). In examples in which the data in various databases is not format-compatible across the databases, the unified social content platform 110 can translate the various data elements into a format, such as a single common format, that can be utilized by the targeted sponsored content platform 114 to obtain targeted content.

In an example, the targeted sponsored content platform 114 produces a list of targeted content for each individual database from which targeted content is to be obtained. In an illustrative example, individual databases include a job posting database, a status update database, an articles database configured to store content such as published informative or entertainment articles and other multimedia content, a user characteristics database, and so forth. The targeted sponsored content platform 114 can separately assess each individual database and obtain targeted content from each database. In an example, the targeted sponsored content platform 114 obtains a predetermined number of targeted results from each database.

Figure 5:
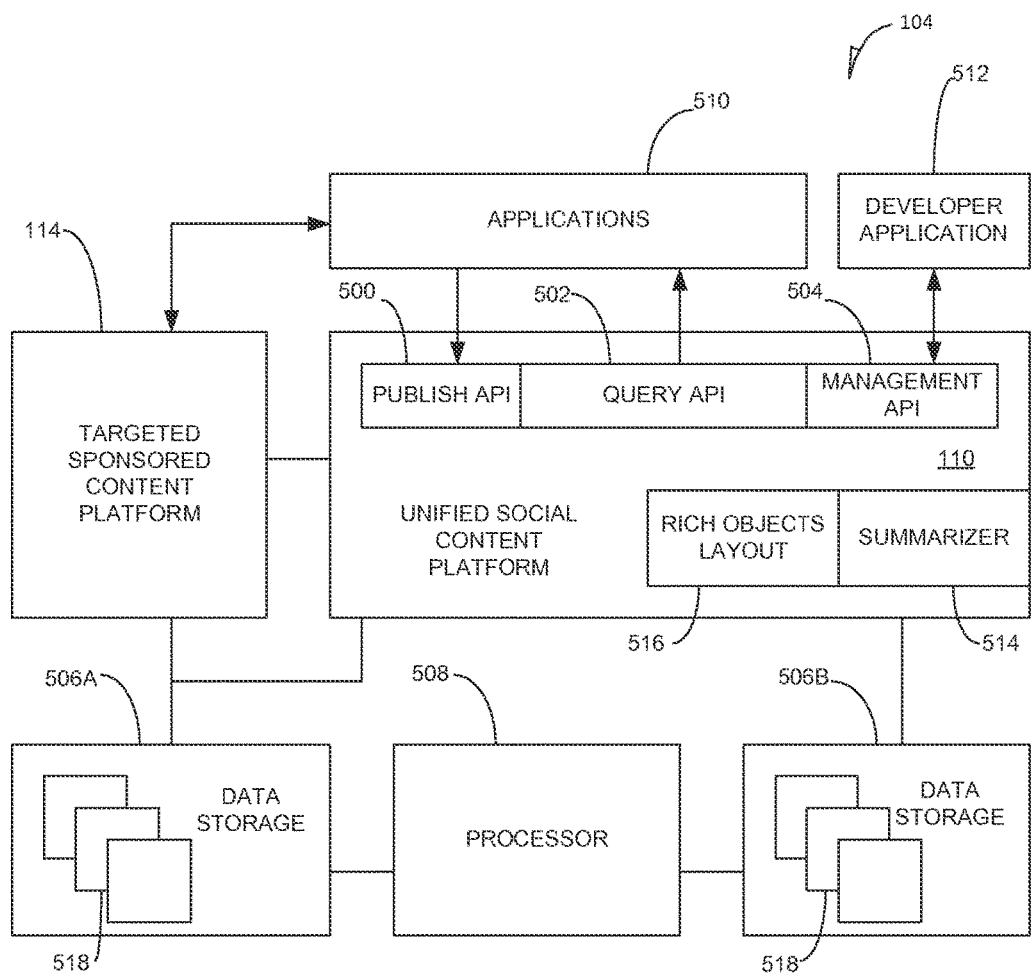
FIG. 5 is a block diagram of a server, in an example embodiment.

FIG. 5 is a block diagram of an example server 104. The server 104 includes the unified social content platform 110 and the targeted sponsored content platform 114. In the illustrated example, the unified social content platform 110 includes a publish application programming interface (API) 500, a query API 502, and a management API 504. In the illustrated example, the electronic data storage 506 of the server 104 provides storage for the unified social content platform 110 but is not itself part of the unified social content platform 110. In the illustrated example, the processor 508 of the server 104 provides processing for provisioning data provided by the unified social content platform 110 but is not itself part of the unified social content platform 110. In alternative examples, the electronic data storage 506 and the processor 508 are components, in whole or in part, of the uniform social content platform 110.

In various examples, the electronic data storage 506 can be or can include an electronic data index in addition to durable storage of data files either for long term storage for dormant files or for files actively utilized by the unified social content platform 110. In various examples, the electronic data index can be utilized for searching functions, such as to identify files without necessarily accessing the files during the search. In various examples, the electronic data index is non-durable data storage, in that the index merely includes information relating to files rather than the files themselves.

The social network server 104 can store information in the electronic data storage 506 related to users of the social network, such as in the form of user characteristics corresponding to individual users of the social network. For instance, for an individual user, the user's characteristics can include one or profile data points, including, for instance, name, age, gender, profession, prior work history or experience, educational achievement, location, citizenship status, leisure activities, likes and dislikes, and so forth. The user's characteristics can further include behavior or activities within and without the social network, as well as the user's social graph. For an organization, such as a company, the information can include name, offered products for sale, available job postings, organizational interests, forthcoming activities, and the like. For a particular available job posting, the job posting can include a job profile that includes one or more job characteristics, such as, for instance, area of expertise, prior experience, pay grade, residency or immigration status, and the like.

User characteristics described above can generally include user profile characteristics, in that they are typically defined by a single discrete label, such as a number, a place, or a binary status. Characteristics included in user behavior, such as can be identified based on user activity within the social network generally. For instance, a user who engages in job searches, such as by entering job keywords into a search engine either of the social network or independent of the social network, can be deemed to have characteristics such as currently seeking a job, and job characteristics that the user is seeking, such as job field, pay grade, location, and the like. Additional user behavior or activities, such as messages to job recruiters, job applications filled out or submitted, and messages to particular companies can also be incorporated. As such, user actions both within and without the social network can be utilized to determine user characteristics such as user behavior.

Activity and behavioral data can be obtained by monitoring and tracking the interactions that a user has with various applications, services and/or content that are provided by, or, integrated or otherwise associated with, the social network service. For example, a social network service may provide any number and variety of applications and/or services with which a member interacts. Similarly, a variety of third-party applications and services may leverage various aspects of the social network service, for example, via one or more application programming interfaces (APIs). A few examples of such applications or services include: search engine applications and services, content sharing and recommendation applications (e.g., photos, videos, music, hyperlinks, slideshow presentations, articles, etc.), job posting and job recommendation applications and services, calendar management applications and services, contact management and address book applications and services, candidate recruiting applications and services, travel and itinerary planning applications and services, and many more.

In the illustrated example, the server 104 includes social network applications 510, such as can interface with, provide, and obtain social network information from the user devices 102 and other sources. The server 104 further includes a developer application 512 configured to allow administrators or developers of the social network to register new criteria for the unified social content platform 110 to provide information on the social network, as disclosed herein. The developer application 512 can include or access a user interface and can access the management API 504. The developer application 512 can allow a developer to create custom social network applications while also adhering to a substantially uniform aesthetic and front end rendering. The uniform social content platform 110 can publish developed applications to the social network substantially immediately.

The publishing API 500 can be called by an application to publish activity to the unified social content platform 110. Published applications 510 can be queried by at least the unified social content platform 110 and identified to a user, such as via the developer application 512. Upon being published, the applications can also be sent to a pipeline to be provisioned to the user devices 102 via the social network.

The processor 508 can manage the pipeline, such as with dedicated pipeline software. The processor 508 can attach data onto activity items that are provided, such as by applications 510, to the user devices 102 via the social network. Such data can include summaries of users, such as users acting on the applications 510, and objects in an activity. In an example, if the actor is a member of the social network then the actor's name, profile picture or profile picture uniform resource locator (URL), and/or other data regarding the member of the social network. In an example, if the object of the action is a webpage, a summary of the web page can be attached. The processor 508 can also be configured, such as within its pipelining functionality, to store an activity to a long term electronic storage 506A, provide a search term to a search index in electronic storage 506B, tally an activity index count, and send an event notification to offline storage.

The unified social content platform 110 can further include a summarizer module 514. The summarizer module 514 can identify a body of an activity item. The body can include a subject, verb, and/or object of the activity item. The body can be provided for searching of activities, with the body providing certain commonly-sought data points for typical searches. The summarizer module 514 can be included in a language-translated or translatable format for searching in various languages. The summarizer module 514 can annotate the body with the location of entities so that the entities can be highlighted and/or hyperlinked by a renderer. Annotations can identify the text that is annotated by start and end offset indices.

The body of the activity items generated by the unified social content platform 110 can be common among all applications. The user devices 102 can be configured to render activities transmitted from the unified social content platform 110 without having to be separately configured for different applications. The content summary can accompany the body in an activity. The body and the content summary can be utilized to create consistent content displays and developer applications. The body can be annotated with semantic regions, allowing users and developers to tailor the display of bodies based on the context. In an example, if a particular company is mentioned in a body, the annotation can indicate to a user device 102 to generate and/or display a profile of the company.

The summarizer module 514 can, in certain examples, create a body for display, such as upon having identified the body. The summarizer module 514 can decorate an activity view, such as on a user device 102, with locale-dependent views of entities, such as members, companies, and so forth. The summarizer module 514 can render a template according to context and dedicated helper functions. Upon rendering, a fully formed body string can be displayed within a display region to show the body.

The processor 508 can provision a pipeline to transmit applications generated by the unified social content platform 110 to the social network generally, such as to be displayed on a user device 102. The pipelining process can utilize a rich objects layout block 516 to convert conventional text into presentational layouts that include graphics, stylized text, and so forth. The rich objects layout block 516 can be provided by the processor 508 or can be provided by dedicated resources, such as processors and electronic memory. The pipeline provided by the processor 508 can further provide storage and indexing of applications, in various examples with or without rich object layouts. The pipeline can be accessible to other applications being generated in the unified social content platform 110 and, in various examples, elsewhere in the system 100, allowing applications in the pipeline to be utilized for other development purposes. The system 100 generally, and in various examples the unified social content platform 110 specifically, can incorporate pipeline monitoring functionality to identify applications in the pipeline, such as by according to a unique identifier.

As noted above, a social network can incorporate various discretely implemented data structures or subsystems in which various types of social network information is provided or stored. For instance, in certain examples, separate databases may store, index, and provide different types information, such as employment characteristics of a member, user activities, and the advertisements. In an example, databases 518 in the electronic data storage 506 generally, and in both the long term electronic storage 506A and the search index 506B in various examples, separately store and provision various informational aspects of the social network.

In various examples, the information stored in one database 518 is not directly compatible with respect to information stored in another database 518. Information stored in one database 518 may, for instance, incorporate different types and formats of data fields, resulting in an inability to store information from one database 518 in another database 518. Each database 518 may be independently and separately search for relevant information. Thus, a search for all information related to a particular member of the social network, for instance, may be conducted in each individual database 518, with each database 518 separately returning information related to the member. In some examples, the unified social content platform 110 can be configured to convert information of the same or related type into a uniform format for use by the system 100. In that way, the unified social content platform 110 can serve to translate between individual databases 518 and the rest of the system 100.

In various examples, contrary to the above examples, the electronic data storage 506 is a component of the unified social content platform 110. In such an example, the functionality of the unified social content platform 110 serves to provide a uniform structure for some or all storage of social network information in the electronic data storage 506. In certain such examples, though data may be stored and organized in separate databases, the data structures of some or all of the databases may be uniform and not require translation or manipulation for use by the rest of the system 100.

The unified social content platform 110 can include, in the case of incorporating the electronic data storage 506 directly, or manipulate, in the case of translating from incompatible databases 518, profiles of members of the social network that include characteristics of the members, the social graph of the members of the social network, and content summaries of applications. The social graph data may be remote to the server 104 or to the social network generally, such as by incorporating distributed social graph information from multiple sources outside of the social network. Such distributed social graph information can be accessed as part of a query execution. These data can include dependent data. In an example, the member profiles can include fields indicating characteristics, such as: member activity; a member age bracket; whether member connections are allowed; whether an open link is allowed by the member; member group information; member connections; member country; a date the member registered with the social network; a default locale; a member profile viewer; a member web profile; various member group exclusions; a member name; a member gender; a member social generation; a member time zone or time zone offset; a member job industry; a identification of an inviter of the member to the social network; a time the member last checked the social network; a last time the member logged in to the social network; a member name preference; a member geographic location; a member unique identifier, a member picture; a member email address; a member status; a member postal code; a preferred member locale; a number of social network proposals accepted by the member; a member region; whether the member requires or required referral to the social network or functions of the social network; member restrictions; a member state; a member social network subscription plan; a member vanity name; a web profile setting, and a member age.

The unified social content platform 110 can incorporate as an organic block or call as a separate block a targeted sponsored content platform 114. The targeted sponsored content platform 114 can be configured to select various forms of sponsored social network content for displaying to particular users and members of the social network based on various criteria, as disclosed herein. In various examples, the targeted sponsored content platform 114 may compare a sponsored content profile against some or all of a user or member profile, a newsfeed position criterion or criteria, and a sponsored content bid, among other factors. The targeted sponsored content platform 114 can incorporate input from the unified social content platform 110. Additionally or alternatively, the targeted sponsored content platform 114 can incorporate input directly from applications 510, data storage 506A, and from other sources such as from user devices 102. In that way, the targeted sponsored content platform 114 can consolidate multiple items of targeted content, such as organic content from individual databases 518 as well as sponsored content, into an overall content presentation for a user of the social network.

In various examples, the unified social content platform 110 can be wholly or substantially self-contained/sufficient. In various examples, the unified social content platform 110 does not make "sideways" calls to another equivalently-tiered block. Rather, like certain super blocks known in the art, the unified social content platform 110 can, in certain examples, make calls "down" to general infrastructure blocks. Such infrastructure blocks can include the electronic data storage 506, certain functions that may be provided by the processor 508, such as the pipelining function. "Cloud" computing functions known in the art can be included as infrastructure.

In various examples, equivalent mid-tier calls can be made by the unified social content platform 110 to other mid-tier or super blocks. In an example, another block of an equivalent or approximately equivalent tier (such as, in various examples discussed herein) to the targeted sponsored content platform 114, to the uniform social content platform 110 can provide proxy calls to the unified social content platform 110. In such an example, various services can provide data to decorate onto the result of the proxy call. Alternatively, the unified social content platform 110 can monitor streaming data from mid-tier or super blocks and maintain read-only replicas of data from the other mid-tier or super blocks.

The unified social content platform 110 can be published with extension points or service provider interfaces (SPI). The unified social content platform 110 can be published as a raw schema and/or as a dedicated client library with an SPI including interfaces that can be implemented to the unified social content platform 110 as well as to the schemas to, for instance, permit the addition of processing elements to the processor 508. The APIs and SPIs of the system 100 generally can be built as independent tasks.

Figure 6:
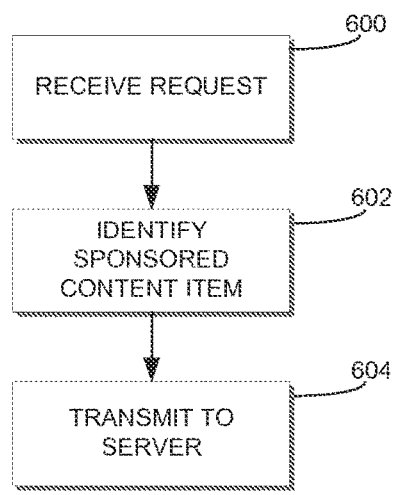
FIG. 6 is a flowchart for providing sponsored content for sponsored content positions in a newsfeed, in an example embodiment.

FIG. 6 is a flowchart for providing sponsored content for sponsored content positions in a newsfeed. While the flowchart will be discussed with respect to the unified social content platform 110, the targeted sponsored content platform 114, and the newsfeed 200 in particular, it is to be recognized and understood that the flowchart is applicable to any suitable device or system.

In operation 600, a request is received, such as by the targeted sponsored content platform from the unified social content platform, for social network content for display in a position of a plurality of sponsored content positions in a newsfeed of a social network interface, each of the plurality of sponsored content positions having a position criterion, at least two of the plurality of sponsored content positions having different position criteria.

In operation 602, the targeted sponsored content platform identifies a sponsored content item of a plurality of sponsored content items stored on a database based, at least in part, on characteristic of the sponsored content item meeting the position criterion and a bid associated with the sponsored content item.

In an example, the targeted sponsored content platform determines a portion of the sponsored content items stored in the database that are valid for being utilized as sponsored content items newsfeed. The validity of the portion of the sponsored content items may be based, at least in part, on a type of sponsored content item. In an example, only certain types of sponsored content items may be subject to the terms of the flowchart. For instance, in an example, sponsored job postings and sponsored company status updates may be valid for the purposes of this flowchart while sponsored company links may not be valid (it is emphasized that sponsored company links may be valid in various examples).

The targeted sponsored content platform generally may identify a predetermined number of the valid sponsored content items, such as by cross-referencing the sponsored content campaign information to identify related sponsored content items that are the subject of some or all of the active campaigns and selecting sponsored content items until the predetermined number of sponsored content items are arrived at. In various examples, the targeted sponsored content platform produces a predetermined number of each type of sponsored content items. The selected sponsored content items may then be provided to the targeted sponsored content platform.

The targeted sponsored content platform may obtain scores for each of the selected sponsored content items, as disclosed herein. Each type of sponsored content item may be scored according to the same or different criteria. As disclosed above, one or more thresholds may be applied to the sponsored content items for determining which, if any, of the positions the sponsored content item may be acceptable for. The sponsored content items may be ranked according to their score, either communally or within their particular type.

The targeted sponsored content platform then places the sponsored content items in sponsored content positions according to meeting threshold criteria and the sponsored content item's individual ranks. Scores may be scaled between types. For instance, types with relatively large predicted resultant social activities, such as sharing, commenting, and the like, such as sponsored company updates, may receive more points or may be weighted higher than types with fewer predicted social actions, such as sponsored job postings.

The targeted sponsored content platform may then sequentially identify sponsored content items to fill the sponsored positions of the newsfeed, such as from top to bottom, according to the highest scores that also qualify for the positions' respective thresholds. Sponsored position that do not have any qualifying sponsored content items may remain unfilled by the targeted sponsored content platform.

At 604, the sponsored content item may be transmitted to a server for display on a user interface. The server may be the sever having the targeted sponsored content platform. As such, the transmittal may merely be from the targeted sponsored content platform to the unified social content platform on the same server. The targeted sponsored content platform may transmit or identify the sponsored content items and corresponding positions to the unified social content platform. The unified social content platform may fill out the newsfeed and format the newsfeed as disclosed herein. The transceiver may transmit the newsfeed 200 to the user device for display on a user interface. Additionally or alternatively, the targeted sponsored content platform may transmit the sponsored content items directly to an intermediate server via the transceiver for provisioning to the user device while bypassing the unified social content platform.

Figure 7:
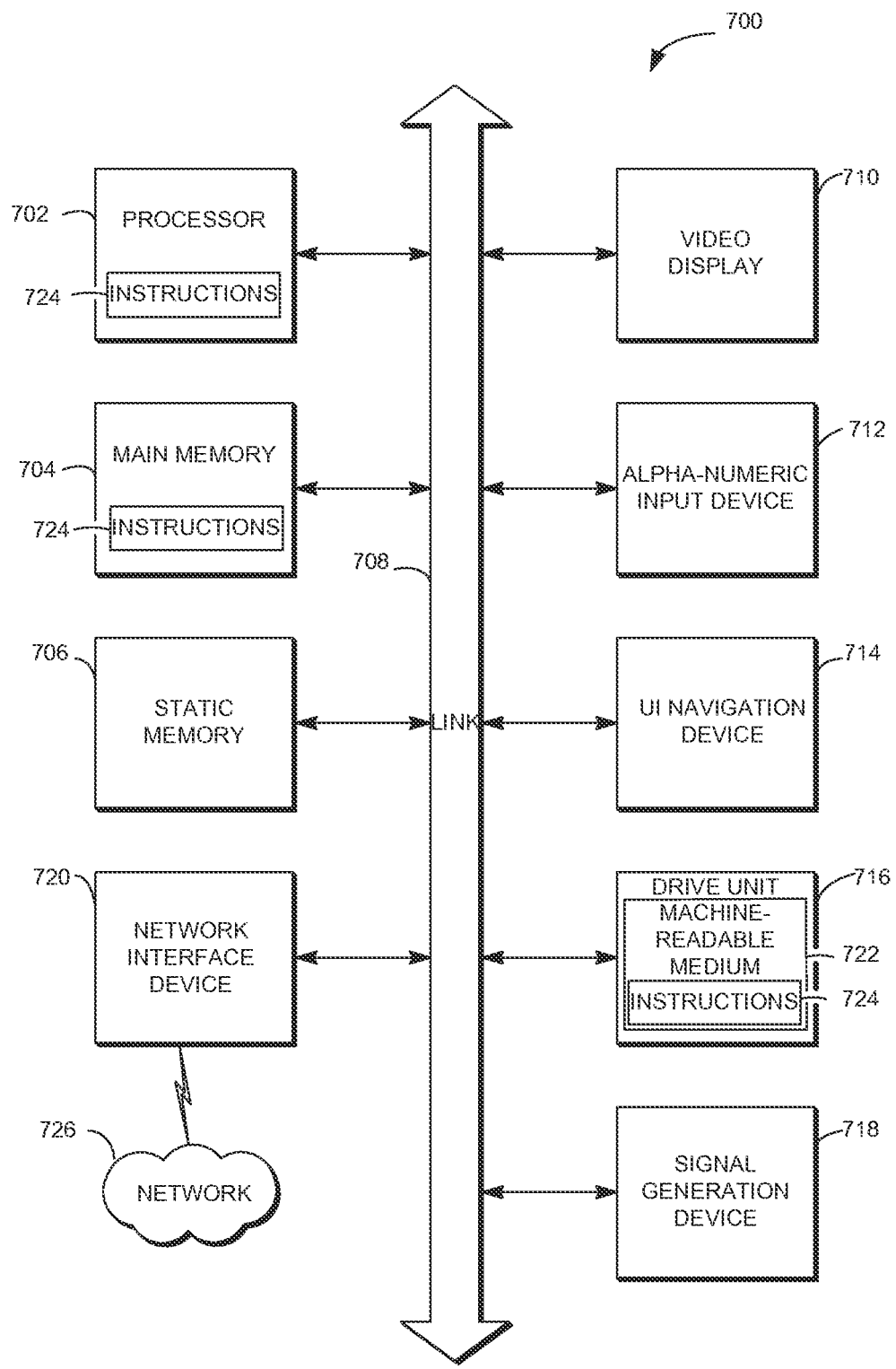
FIG. 7 is a block diagram illustrating components of a machine able to read instructions from a machine-readable medium, in an example embodiment.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   one or more computer processors; and
   one or more computer-readable mediums storing instructions that, when executed by the one or more computer processors, cause the system to perform operations comprising:
   generating a plurality of available positions to be displayed in a data feed;
   designating a first position and a second position from the plurality of available positions to be filled by content selected from a set of sponsored content items;
   designating at least a third position from the plurality of available positions to be filled by content selected from a set of organic content items that are not included in the set of sponsored content items;
   assigning a first threshold score to the first position;
   assigning a second threshold score to the second position, the second threshold score being less than the first threshold score;
   receiving, over a network, a first content request to fill the first position of the plurality of available positions in the data feed, the data feed, being displayed in a user interface;
   for each sponsored content itetn included in the set of sponsored content items, calculating a score based on a cost value and an engagement value assigned to the respective sponsored content item, yielding a set of scores for the set of sponsored content items, the cost value assigned to each sponsored content item being a monetary bid value offered by a content provider associated with the respective sponsored content item for each user interaction with the respective sponsored content item, and the engagement value assigned to each content item indicating an estimated likelihood that a user will interact with the respective sponsored content item based on historical data, wherein calculating each score comprises multiplying the cost value for the respective sponsored content item by the engagement value for the respective sponsored content item, wherein the set of scores includes a first score for a first sponsored content item from the set of sponsored content items;
   in response to determining that none of the scores from the set of scores for the set of sponsored content items meets or exceeds the first threshold score, returning a content item from the set of organic content items to fill the first position;

subsequently receiving a second content request to fill the second position of the plurality of available positions in the data feed;

determining that the score for the first sponsored content item from the set of sponsored content items meets or exceeds the second threshold score, the score for the first sponsored content item being lower than the first threshold score; and returning the first sponsored content item to fill the second position.

2. The system of claim 1, wherein the plurality of available positions are ordered from a high position to a low position and the threshold score assigned to each position from the plurality of available positions is based, at least in in part, on the order of the respective position in the plurality of available positions.

3. The system of claim 1, wherein the plurality of available positions are organized as an ordered list.

4. The system of claim 1, wherein the plurality of available positions are organized in a series of pages.

5. The system of claim 1, the operations further comprising:

determining that a second score for a second sponsored content item from the set of sponsored content items meets or exceeds the second threshold score; and determining that the first score for the first sponsored content item is greater than the second score for the second sponsored content item, yielding a determination; and selecting the first sponsored content item to fill the second position based on the determination.

6. A method comprising:

generating a plurality of available positions to be displayed in a data feed;

designating a first position and a second position from the plurality of available positions to be filled by content selected from a set of sponsored content items;

designating at least a third position from the plurality of available positions to be filled by content selected from a set of organic content items that are not included in the set of sponsored content items;

assigning a first threshold score to the first position;

assigning a second threshold score to the second position, the second threshold score being less than the first threshold score;

receiving, over a network, a first content request to till the first position of the plurality of available positions in the data feed, the data feed, being displayed in a user interface;

for each sponsored content item included in the set of sponsored content items, calculating a score based on a cost value and an engagement value assigned to the respective sponsored content item, yielding a set of scores for the set of sponsored content items, the cost value assigned to each sponsored content item being a monetary bid value offered by a content provider associated with the respective sponsored content item for each user interaction with the respective sponsored content item, and the engagement value assigned to each content item indicating an estimated likelihood that a user will interact with the respective sponsored content item based on historical data, wherein calculating each score comprises multiplying the cost value for the respective sponsored content item by the engagement value for the respective sponsored content item, wherein the set of scores includes a first score for a first sponsored content item from the set of sponsored content items;

in response to determining that none of the scores from the set of scores for the set of sponsored content items meets or exceeds the first threshold score, returning a content item from the set of organic content items to fill the first position;

subsequently receiving a second content request to fill the second position of the plurality of available positions in the data feed;

determining that the score for the first sponsored content item from the set of sponsored content items meets or exceeds the second threshold score, the score for the first sponsored content item being lower than the first threshold score; and returning the first sponsored content item to fill the second position.

7. The method of claim 6, wherein the plurality of available positions are ordered from a high position to a low position and the threshold score assigned to each position from the plurality of available positions is based, at least in in part, on the order of the respective position in the plurality of available positions.

8. The method of claim 6, wherein the plurality of available positions are organized as an ordered list.

9. The method of claim 6, wherein the plurality of available positions are organized in a series of pages.

10. The method of claim 6, further comprising:

determining that a second score for a second sponsored content item from the set of sponsored content items meets or exceeds the second threshold score; and determining that the first score for the first sponsored content item is greater than the second score for the second sponsored content item, yielding a determination; and selecting the first sponsored content item to fill the second position based on the determination.

11. A non-transitory computer-readable medium storing instructions that, when executed by one or more computer processors of one or more computing devices, cause the one or more computing device to perform operations comprising:

generating a plurality of available positions to be displayed in a data feed;

designating a first position and a second position from the plurality of available positions to be filled by content selected from a set of sponsored content items;

designating at least a third position from the plurality of available positions to be filled by content selected from a set of organic content items that are not included in the set of sponsored content items;

assigning a first threshold score to the first position;

assigning a second threshold score to the second position, the second threshold score being less than the first threshold score;

receiving, over a network, a first content request to fill the first position of the plurality of available positions in the data feed, the data feed, being displayed in a user interface;

for each sponsored content item included in the set of sponsored content items, calculating a score based on a cost value and an engagement value assigned to the respective sponsored content item, yielding a set of scores for the set of sponsored content items, the cost value assigned to each sponsored content item being a monetary bid value offered by a content provider associated with the respective sponsored content item for each user interaction with the respective sponsored content item, and the engagement value assigned to each content item indicating an estimated likelihood that a user will interact with the respective sponsored content item based on historical data, wherein calculating each score comprises multiplying the cost value for the respective sponsored content item by the engagement value for the respective sponsored content item, wherein the set of scores includes a first score for a first sponsored content item from the set of sponsored content items;

in response to determining that none of the scores from the set of scores for the set of sponsored content items meets or exceeds the first threshold score, returning a content item from the set of organic content items to fill the first position;

subsequently receiving a second content request to fill the second position of the plurality of available positions in the data feed;

determining that the score for the first sponsored content item from the set of sponsored content items meets or exceeds the second threshold score, the score for the first sponsored content item being lower than the first threshold score; and returning the first sponsored content item to fill the second position.

12. The non-transitory computer-readable medium of claim 11, wherein the plurality of available positions are ordered from a high position to a low position and the threshold score assigned to each position from the plurality of available positions is based, at least in in part, on the order of the respective position in the plurality of available positions.

13. The non-transitory computer-readable medium of claim 11, wherein the plurality of available positions are organized as an ordered list.

14. The non-transitory computer-readable medium of claim 11, wherein the plurality of available positions are organized in a series of pages.

15. The non-transitory computer-readable medium of claim 11, the operations further comprising:
   determining that a second score for a second sponsored content item from the set of sponsored content items meets or exceeds the second threshold score; and
   determining that the first score for the first sponsored content item is greater than the second score for the second sponsored content item, yielding a determination; and
   selecting the first sponsored content item to fill the second position based on the determination.

* * * * *